(12) United States Patent
Shin

(10) Patent No.: US 11,156,756 B2
(45) Date of Patent: Oct. 26, 2021

(54) OPTICAL FILM INCLUDING COLLIMATING REFLECTIVE POLARIZER

(71) Applicant: 3M INNOVATIVE PROPERTIES COMPANY, St. Paul, MN (US)

(72) Inventor: Jong-Seok Shin, Hwa-eoung-Si (KR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 206 days.

(21) Appl. No.: 15/109,092

(22) PCT Filed: Dec. 19, 2014

(86) PCT No.: PCT/US2014/071669
§ 371 (c)(1),
(2) Date: Jun. 29, 2016

(87) PCT Pub. No.: WO2015/102961
PCT Pub. Date: Jul. 9, 2015

(65) Prior Publication Data
US 2016/0327712 A1   Nov. 10, 2016

Related U.S. Application Data

(60) Provisional application No. 61/921,802, filed on Dec. 30, 2013.

(51) Int. Cl.
*G02F 1/13357* (2006.01)
*G02B 5/30* (2006.01)
*F21V 8/00* (2006.01)
*G02B 27/30* (2006.01)
*G02B 3/00* (2006.01)
(Continued)

(52) U.S. Cl.
CPC ......... *G02B 5/3033* (2013.01); *G02B 3/0006* (2013.01); *G02B 5/305* (2013.01); *G02B 6/003* (2013.01); *G02B 6/0031* (2013.01); *G02B 6/0053* (2013.01); *G02B 6/0055* (2013.01); *G02B 6/0056* (2013.01);
(Continued)

(58) Field of Classification Search
CPC ...... G02B 5/3033; G02B 27/30; G02B 6/003; G02B 6/0031
USPC ........................................................ 362/607
See application file for complete search history.

(56) References Cited

U.S. PATENT DOCUMENTS 3,610,729 A   1/1971   Howard
4,446,305 A   5/1984   Rogers
(Continued)

FOREIGN PATENT DOCUMENTS

CN   101446656 A   6/2009
KR   10-2009-0070830   7/2009
(Continued)

OTHER PUBLICATIONS

Weber, "Giant Birefringent Optics in Multilayer Polymer Mirrors", Science, Mar. 31, 2000, vol. 287, pp. 2451-2456.
(Continued)

*Primary Examiner* — Toan C Ly
(74) *Attorney, Agent, or Firm* — Jonathan L. Tolstedt

(57) ABSTRACT

Optical films are disclosed. More particularly, optical films including a collimating reflective polarizer are disclosed. The optical films are useful in backlights, and in particular backlight recycling cavities. Constructions suitable with both edge-lit and direct-lit backlights are disclosed.

14 Claims, 6 Drawing Sheets

(51) Int. Cl.
*G02B 27/28* (2006.01)
*G02F 1/1335* (2006.01)

(52) U.S. Cl.
CPC ........... *G02B 27/283* (2013.01); *G02B 27/30* (2013.01); *G02F 1/133606* (2013.01); *G02F 1/133607* (2021.01)

(56) References Cited

U.S. PATENT DOCUMENTS

| | | | |
|---|---|---|---|
| 4,540,623 | A | 9/1985 | Im |
| 5,103,337 | A | 4/1992 | Schrenk |
| 5,360,659 | A | 11/1994 | Arends |
| 5,448,404 | A | 9/1995 | Schrenk |
| 5,882,774 | A | 3/1999 | Jonza |
| 6,104,534 | A | 8/2000 | Ohta |
| 6,104,536 | A | 8/2000 | Eckhardt |
| 6,157,490 | A | 12/2000 | Wheatley |
| 6,268,961 | B1 | 7/2001 | Nevitt |
| 6,368,699 | B1 | 4/2002 | Gilbert |
| 6,531,230 | B1 | 3/2003 | Weber |
| 6,783,349 | B2 | 8/2004 | Neavin |
| 9,377,630 | B2 | 6/2016 | Wu et al. |
| 2005/0270655 | A1* | 12/2005 | Weber ................... G02B 5/305 359/630 |
| 2009/0135335 | A1 | 5/2009 | Lee et al. |
| 2009/0219461 | A1* | 9/2009 | Zhou ................. G02F 1/133606 349/62 |
| 2011/0272849 | A1 | 11/2011 | Neavin |
| 2011/0279997 | A1 | 11/2011 | Weber |
| 2012/0060485 | A1 | 3/2012 | Yamada |

FOREIGN PATENT DOCUMENTS

| | | |
|---|---|---|
| KR | 10-2010-0060433 | 6/2010 |
| KR | 10-2010-0095765 | 9/2010 |
| KR | 10-2012-0021937 | 3/2012 |
| TW | 201024804 A | 7/2010 |
| WO | WO 1995-17303 | 6/1995 |
| WO | WO 1999-39224 | 8/1999 |
| WO | WO 2013-059226 | 4/2013 |
| WO | WO 2013-059228 | 4/2013 |

OTHER PUBLICATIONS

International Search Report for PCT International Application No. PCT/US2014/071669 dated Mar. 18, 2015, 4 pages.

* cited by examiner

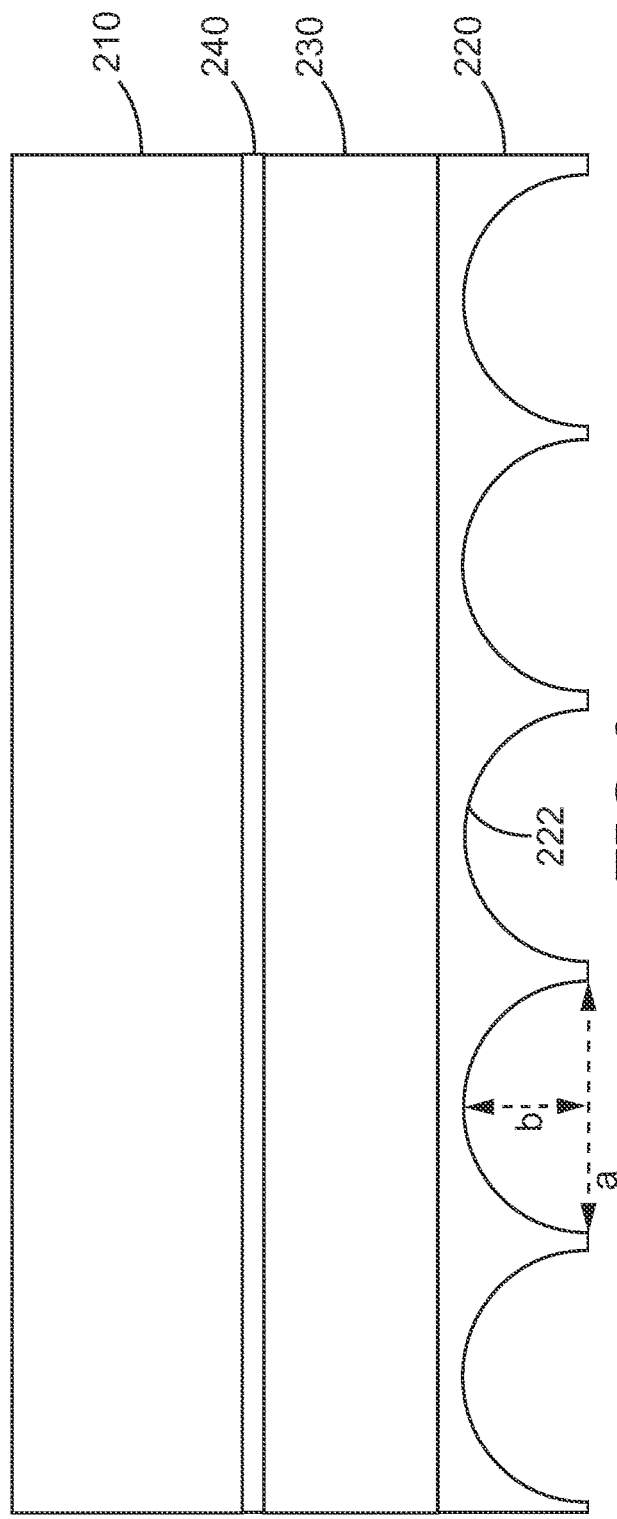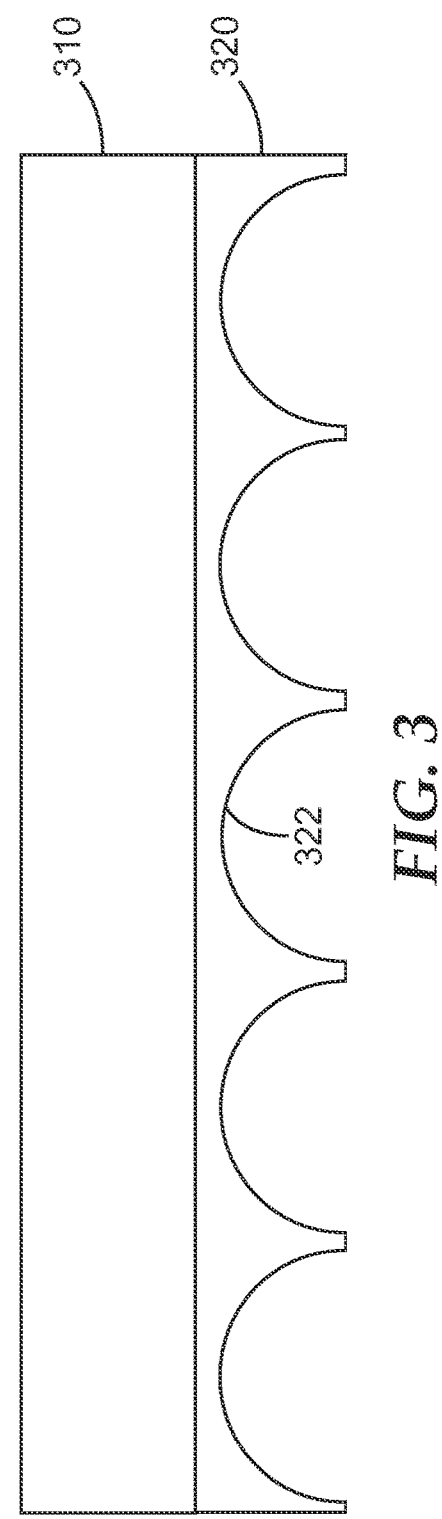

OPTICAL FILM INCLUDING COLLIMATING REFLECTIVE POLARIZER

CROSS REFERENCE TO RELATED APPLICATIONS

This application is a national stage filing under 35 U.S.C. 371 of PCT/US2014/071669, filed Dec. 19, 2014, which claims the benefit of U.S. Provisional Application No. 61/921,802, filed Dec. 30, 2013, the disclosure of which is incorporated by reference in their entirety herein.

BACKGROUND

Reflective polarizers substantially transmit light having one polarization state while substantially reflecting light having an orthogonal polarization state and are used in backlights for display devices. In some cases, reflective polarizers are coupled with other reflective surfaces to create a light recycling cavity. Microreplicated films having a plurality of light directing elements may be used to change the angular distribution of light.

SUMMARY

In one aspect, the present disclosure relates to an optical film. The optical film includes a collimating reflective polarizer and an array of concave microlenses disposed on a major surface of the collimating reflective polarizer. In some embodiments, the collimating reflective polarizer has a transmission along a pass axis at normal incident of Tpassnormal for p-pol light and a transmission along a pass axis at 60 degrees incidence of Tpass60 for p-pol light, and a ratio of Tpass60 to Tpassnormal is less than 0.75. In some embodiments, the ratio of Tpass60 to Tpassnormal is less than 0.60 or 0.50. In some embodiments, the array of concave microlenses is randomly arranged. In some embodiments, the array of concave microlenses is regularly arranged. In some embodiments, each microlens in the array of concave microlenses has an aspect ratio of about 0.5. In some embodiments, each microlens in the array of concave microlenses has an aspect ratio of about 0.3. In some embodiments, each microlens in the array of concave microlenses has an aspect ratio of less than about 0.5. In some embodiments, the optical film further includes microfeatures disposed on a surface of the collimating reflective polarizer not disposed on the array of concave microlenses. The microfeatures may include beads. In some embodiments, a mean diameter of the beads is about 8 µm. In some embodiments, the microfeatures include convex lenses or prisms. In some embodiments, the optical film has a thickness of less than 420 µm. In some embodiments, an edge-lit backlight assembly includes the optical film and a lightguide, where the lightguide is disposed proximate the array of concave microlenses. In some embodiments, a direct-lit backlight assembly includes the optical film and one or more light sources, where the one or more light sources are disposed proximate the array of concave microlenses.

In another aspect, the present disclosure relates to an optical film including an optical substrate having a first and second major surface, a collimating reflective polarizer disposed on the first major surface of the optical substrate, and an array of concave microlenses disposed on the second major surface of the optical substrate. In some embodiments, the optical film further includes an adhesive between the optical substrate and the collimating reflective polarizer. In some embodiments, the collimating reflective polarizer has a transmission along a pass axis at normal incident of Tpassnormal for p-pol light and a transmission along a pass axis at 60 degrees incidence of Tpass60 for p-pol light, and a ratio of Tpass60 to Tpassnormal is less than 0.75. In some embodiments, the ratio of Tpass60 to Tpassnormal is less than 0.60 or 0.50. In some embodiments, the array of concave microlenses is randomly arranged. In some embodiments, the array of concave microlenses is regularly arranged. In some embodiments, each microlens in the array of concave microlenses has an aspect ratio of about 0.5. In some embodiments, each microlens in the array of concave microlenses has an aspect ratio of about 0.3. In some embodiments, each microlens in the array of concave microlenses has an aspect ratio of less than about 0.5. In some embodiments, the optical film further includes microfeatures disposed on a surface of the collimating reflective polarizer not disposed on the optical substrate. The microfeatures may include beads. In some embodiments, a mean diameter of the beads is about 8 µm. In some embodiments, the microfeatures include convex lenses or prisms. In some embodiments, the optical film has a thickness of less than 420 µm. In some embodiments, an edge-lit backlight assembly includes the optical film and a lightguide, where the lightguide is disposed proximate the array of concave microlenses. In some embodiments, a direct-lit backlight assembly includes the optical film and one or more light sources, where the one or more light sources are disposed proximate the array of concave microlenses.

BRIEF DESCRIPTION OF THE DRAWINGS

FIG. 2 is a side elevation cross-section of an optical film including a collimating reflective polarizer.

FIG. 3 is a side elevation cross-section of another optical film including a collimating reflective polarizer.

DETAILED DESCRIPTION

Figure 1:
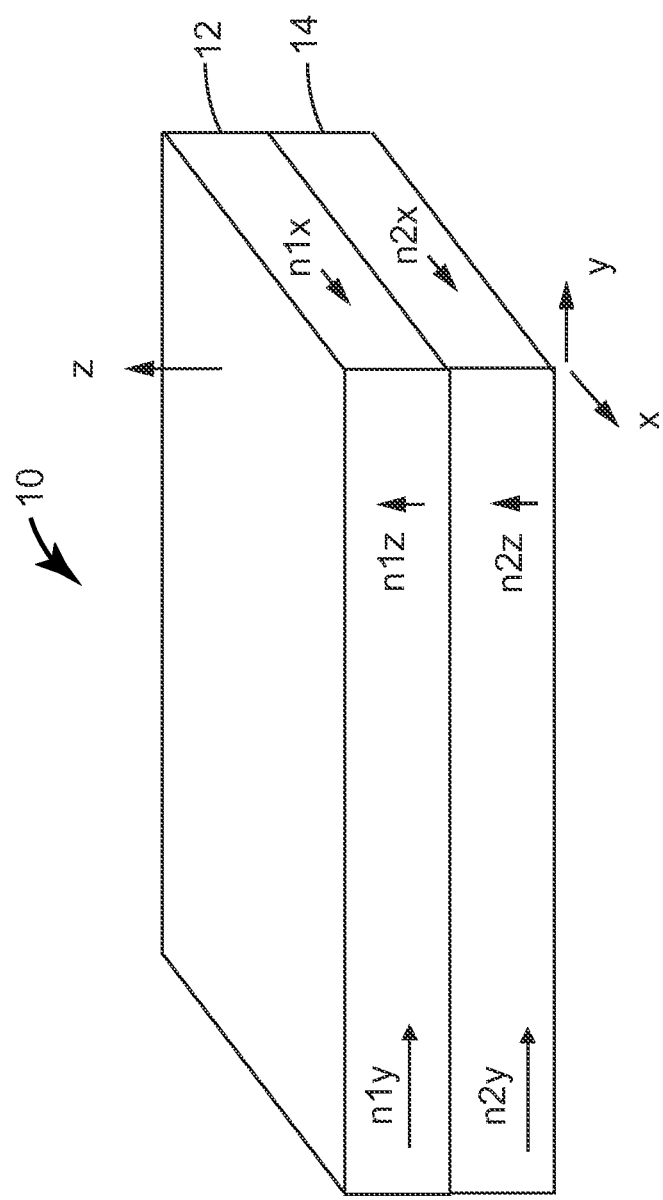
FIG. 1 is a top perspective schematic view of a multilayer optical film.

FIG. 1 is a top perspective schematic view of a multilayer optical film. Multilayer optical film 10 includes first layers 12 and second layers 14.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters,* 2nd Ed., Macmillan Publishing Co. (1986) and by A. Thelan, *Design of Optical Interference Filters,* McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No.

5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

Referring now to FIG. 1, a schematic perspective view of an exemplary optical repeat unit (ORU) of a multilayer optical film is illustrated. FIG. 1 depicts only two layers of a multilayer optical film 10, which can include tens or hundreds of such layers arranged in one or more contiguous packets or stacks. The film 10 includes individual microlayers 12, 14, where "microlayers" refer to layers that are sufficiently thin so that light reflected at a plurality of interfaces between such layers undergoes constructive or destructive interference to give the multilayer optical film the desired reflective or transmissive properties. The microlayers 12, 14 can together represent one optical repeat unit (ORU) of the multilayer stack, an ORU being the smallest set of layers that recur in a repeating pattern throughout the thickness of the stack. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by refractive index) of less than about 1 micrometer.

In some cases, the microlayers 12, 14 have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, typically followed by passing the multilayer extrudate through one or more multiplication die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5*\Delta n_x$, or $\Delta n_z \leq 0.25*\Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z<0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 60° incidence is measured in p-polarized pass light. If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Reflective polarizers are often used in visual display systems such as liquid crystal displays. These systems—now found in a wide variety of electronic devices such as mobile phones, computers including tablets, notebooks, and subnotebooks, and some flat panel TVs—use a liquid crystal (LC) panel illuminated from behind with an extended area backlight. The reflective polarizer is placed over or otherwise incorporated into the backlight to transmit light of a polarization state useable by the LC panel from the backlight to the LC panel. Light of an orthogonal polarization state, which is not useable by the LC panel, is reflected back into the backlight, where it can eventually be reflected back towards the LC panel and at least partially converted to the useable polarization state, thus "recycling" light that would normally be lost, and increasing the resulting brightness and overall efficiency of the display.

FIG. 2 is a side elevation cross-section of an optical film including a collimating reflective polarizer. Optical film 200 includes collimating reflective polarizer 210, microlens array 220 including lenslet 222, optical substrate 230, and adhesive 240.

Collimating reflective polarizer 210 may be any suitable thickness. In some embodiments collimating reflective polarizer 210 may be a multilayer collimating reflective polarizer. For multilayer collimating reflective polarizer, the layer thicknesses and indices of refraction may be selected to provide better transmission of on-axis incident light versus obliquely incident light. Combined with a back reflector, collimating reflective polarizers may recycle obliquely incident light. On subsequent passes, recycled light may be more likely to be transmitted on-axis, resulting in a collimating effect. As described, for example, in PCT Publication WO 2013/059225 A1 (Weber et al.), a useful indication of the potential degree of collimation of light from a recycling backlight using such films may be obtained from the ratio of transmitted p-pol light at normal incidence (Tpassnormal) and 60 degrees incidence (Tpass60) of a given film. Useful collimating reflective polarizers may have ratios of Tpass60 to Tpassnormal of less than 0.75, 0.6, 0.5 or lower.

Microlens array 220 includes a series of lenslet 222. Microlens array 220—despite its label—need not include lenslets, but may instead or additionally include any other microfeature, such as prisms, or spheres. In some embodiments, the microfeatures of microlens array 220 are inverted; that is, the feature's inverse shape is a lenslet (as shown in FIG. 2), sphere, or prism. In some embodiments the microfeatures may extend in one in-plane direction; in other words, microlens array 220 may be a one dimensional array. In some embodiments, microlens array 220 may be a two dimensional array. Microlens array 220 may be arranged regularly, randomly, or pseudorandomly and may have any suitable pitch. In some embodiments, lenslet 222 are closely packed; in some embodiments lenslet 222 are spaced away from one another. Lenslet 222 may even partially overlap one another on microlens array 220. Lenslet 222 includes two characteristic dimensions: its width a and height (or depth) b. Lenslet 222 may be characterized by its aspect ratio, which for the purposes of this application is given by b/a. Lenslet 222 may include at least one curved surface. In some embodiments, lenslet 222 may include only curved surfaces. Lenslet 222 as depicted in FIG. 2 may, at least for the purposes of this application be considered to be and referred to as a concave microfeature.

The aspect ratio of lenset 222 may be important in designing a stack with appropriate optical properties. Aspect ratio may in some cases be a tradeoff between collimating effect and diffusion. For example, for lenslets, a relatively higher aspect ratio may provide comparatively better diffusion while providing less collimating effect. In some embodiments, an aspect ratio of about 0.5 is suitable. In some embodiments, an aspect ratio of less than 0.5, for example, about 0.3 is suitable. Individual lenslets within microlens array 220 may have variations in aspect ratio beyond normal manufacturing variability. In such cases, the average aspect ratio may be less than 0.5, or any other suitable value.

Microlens array 220 may be formed through any suitable process, including microreplication processes such as casting and curing. The resin used to form microlens array 220 may be selected for its processing capabilities, other physical properties such as durability, melt, and warp resistance, and optical properties such as index of refraction, transparency, and diffusive qualities. In some embodiments, the area between lenset 222 of microlens array 220 may be rounded, squared off, or otherwise modified to reduce potential scratching of adjacent films.

Optical substrate 230 is disposed between collimating reflective polarizer 210 and microlens array 220. In some embodiments microlens array 220 is microreplicated directly onto optical substrate 230. Optical substrate 230 and microlens array 220 may be the same material, and in some embodiments they may be part of the same monolithic piece of material. In other embodiments, optical substrate 230 may be adhered or laminated to microlens array 220. Optical substrate may be any suitable material, including polymeric materials such as polyethylene terephthalate (PET), polycarbonate (PC), or poly(methyl methacrylate) (PMMA). Optical substrate 230 may be any suitable dimensions, including any suitable thickness. In some embodiments, the appropriate thickness may be chosen to provide suitable rigidity. In some embodiments optical substrate 230 may have its thickness chosen to provide suitable optical path length between microlens array 220 and collimating reflective polarizer 210. Optical substrate 230 may be substantially transparent and optically inert, or it may have optical functionality such as being a bulk diffuser, or including absorbing polarizing elements or dyes.

Adhesive 240 is optionally disposed between collimating reflective polarizer 210 and optical substrate 230. Adhesive 240 may be any suitable adhesive, including an optically clear adhesive (OCA), a pressure sensitive adhesive (PSA), or a heat or UV-curable adhesive. In some embodiments, it may be desirable for adhesive 240 to be optically inert, i.e., transparent. In other embodiments adhesive 240 may include pigment, diffusing particles, or other optically active components which alter or modify light travelling through optical film 200.

The overall configuration of optical film 200 depicted in FIG. 2 may be of any suitable size and may have any suitable dimensions. In some embodiments the layers of optical film 200 may be of the same size, and may even be manufactured or stored in roll form, to be converted to parts of desired size. In general, optical film 200 has two outer surfaces: the first adjacent to collimating reflective polarizer 210, and the second adjacent to microlens array 220. Optical film 200 may contain other films and optical components, such as a turning film, absorbing polarizer, or diffuser attached to the first outer surface adjacent to collimating reflective polarizer 210.

Concave microlens arrays are not generally used in conjunction with reflective polarizers in a recycling backlight. In particular, concave microlens arrays were thought to have a diffusing effect that is too strong and undesirable in terms of backlight efficiency. Applicants have surprisingly discovered, however, that in combination with a collimating reflective polarizer, concave microlens arrays may provide desired overall collimation effects with adequate diffusion for backlight defect hiding. This allows for greater flexibility in backlight design and enables thinner constructions with comparable or superior performance as standard backlight recycling cavities. Further, the thinner base construction enables design flexibility in adding more optical features, components, or layers within a backlight while preserving acceptable overall thickness.

FIG. 3 is a side elevation cross-section of another optical film including a collimating reflective polarizer. Optical film 300 includes collimating reflective polarizer 310 and microlens array 320 including lenslet 322. FIG. 3 depicts an alternative configuration of an optical film, generally corresponding to optical film 200 in FIG. 2, however, microlens array 320 is microreplicated or otherwise formed directly onto collimating reflective polarizer 310.

Optical film 300 may be a naturally thinner construction because it does not include an optical substrate. The thinness may be desirable in some applications, including handheld and mobile displays. Otherwise, the selection and design of microlens array 320 and collimating reflective polarizer 310 may take into account the same considerations and features as described above for the corresponding elements 210 and 220 in FIG. 2.

Figure 4:
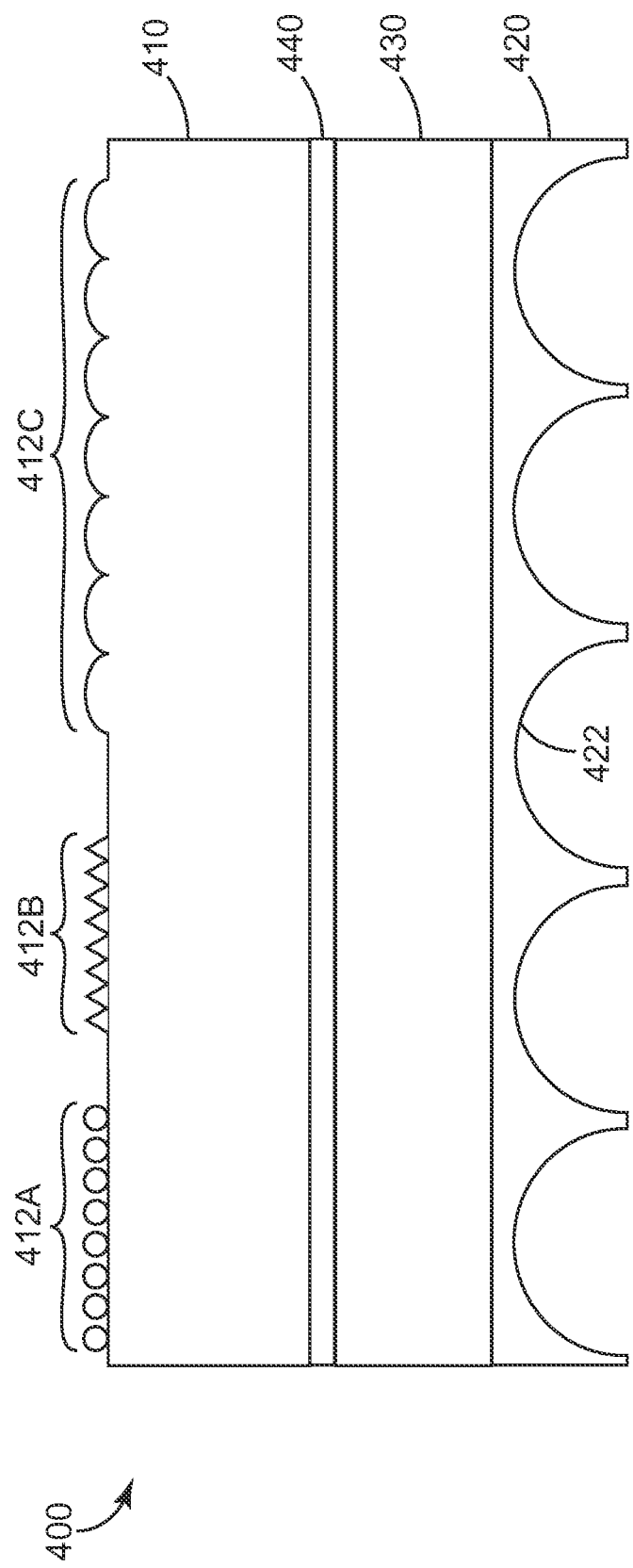
FIG. 4 is a side elevation cross-section of another optical film including a collimating reflective polarizer.

FIG. 4 is a side elevation cross-section of another optical film including a collimating reflective polarizer. Optical film 400 includes collimating reflective polarizer 410 including beads 412A, prisms 412B, and lenses 412C, microlens array 420 including lenslet 422, optical substrate 430, and adhesive 440. Optical film 400 in FIG. 4 generally corresponds to optical film 200 in FIG. 2, however FIG. 4 illustrates a variety of top-surface microstructures and microfeatures that may be provided on certain embodiments.

Beads 412A may be disposed on a surface adjacent to collimating reflective polarizer 410, and may perform several functions. In some embodiments, beads 412A can function as an anti-wetout, an anti-reflection, or anti-Newton ring layer. Appropriate bead size and density based on desired functionality will be apparent to those with skill in the art. In some embodiments, 8 μm beads (beads having a mean diameter of 8 μm) may be used. Smaller beads, even beads as small as 1 μm or smaller may be appropriate in some embodiments. The beads may be deposited in a binder or a solution or solvent, which in some cases may be evaporated away, leaving the beads disposed on or adhered to the surface of optical film 400. Beads 412A may also provide scratch resistance or protection for collimating reflective polarizer 410. Beads 412A may either be transparent or opaque and can be of any suitable material.

Prisms 412B and lenses 412C are shown on optical film 400 to demonstrate the variety of surface structures possible in embodiments of the optical film described herein. Prisms 412B, for example, may be useful to further collimate light. Any suitable pitch and arrangement of these microfeatures is contemplated in conjunction with optical film 400. While FIG. 4 shows beads 412A, prisms 412B, and lenses 412C on the same optical film for illustrative convenience and is not intended to necessarily suggest discrete sections of different microfeatures, in some embodiments more than one type of microfeature may be disposed on optical film 400.

Figure 5:
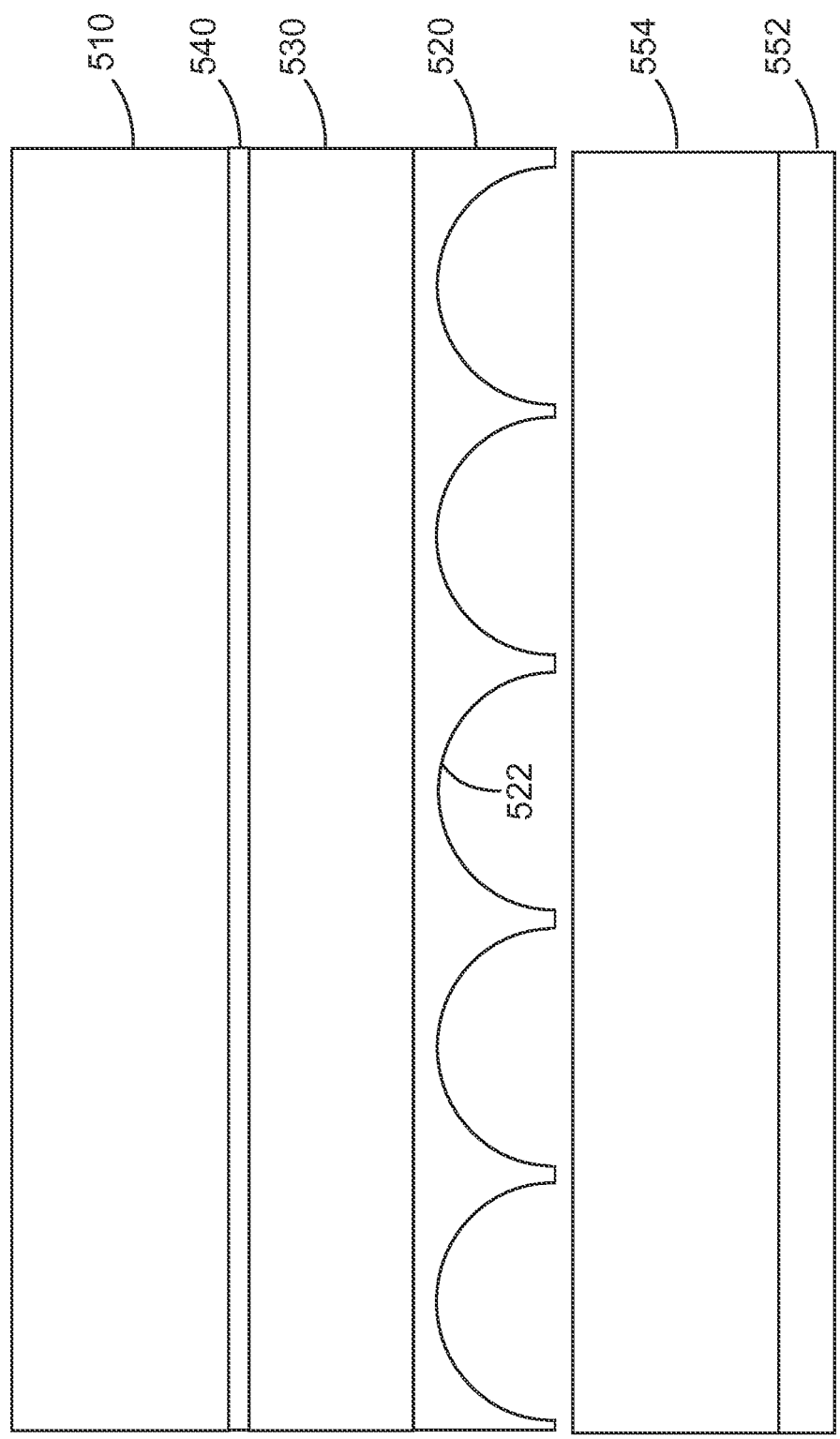
FIG. 5 is a side elevation cross-section of a portion of an edge-lit backlight including the optical film of FIG. 2.

FIG. 5 is a side elevation cross-section of a portion of an edge-lit backlight including the optical film of FIG. 2. Optical stack 500 includes collimating reflective polarizer 510, microlens array 520 including lenslet 522, optical substrate 530, adhesive 540, one or more light sources 550, reflector 552, and lightguide 554.

Optical stack 500 shows an optical film corresponding essentially to optical film 200 in FIG. 2, including collimating reflective polarizer 510, microlens array 520 including lenslet 522, optical substrate 530, and adhesive 540. In addition, optical stack 500 includes one or more light sources 550, reflector 552, and lightguide 554.

The configuration of one or more light sources 550, reflector 552, and lightguide 554 are typical of an edge-lit system. In such a system, light is injected from one or more light sources 550 and enters lightguide 554. Injection of light from one or more light sources 550 into lightguide 554 may utilize injection or collimation optics. Light is transported within lightguide 554 through total internal reflection at one or more interfaces. In FIG. 5, the top surface of lightguide 554 is depicted as being exposed to air. Light incident on the lightguide/air interface at more than the critical angle (calculated from the well known Snell's law) is totally internally reflected. Reflector 552 also serves to transport the light and may be specularly or semi-specularly reflective. In some embodiments, lightguide 554, reflector 552, or both may include diffusing or extracting features that help decouple transported light from lightguide 554 and cause it to be incident on the lightguide/air interface at less than the critical angle. In this way, light from one or more light sources 550 is made incident on the portion of optical stack 500 that includes the film equivalent to optical film 200 described in conjunction with FIG. 2. Light that may be reflected by collimating reflective polarizer 510 is reflected back down through lightguide 554 and is incident on reflector 552 before being reflected back up toward the optical film. In this way, light is recycled to a more useable polarization state or incidence angle, when it otherwise may be emitted (from the ultimate backlight or viewing device) at unusable or undesirable viewing angles or absorbed by other components within the backlight.

One or more light sources 550 may be any number of light sources, including CCFLs, LEDs, incandescent light bulbs, or any combination thereof. One or more light sources 550 may in some embodiments emit over a limited range of wavelengths; in some embodiments, different light sources of the one or more light sources may emit over different wavelength ranges. In some embodiments, one or more light sources 550 may emit substantially white light. In embodiments where one or more light sources 550 includes LEDs, one or more light sources 550 may emit a substantially Lambertian distribution of light.

Lightguide 554 may be constructed from any suitable material and may be of any suitable shape or size. For example, a lightguide may be formed from acrylic and may be planar, tapered, or curved. Reflector 552 may be any suitable reflector. In some embodiments reflector 552 may be a multilayer reflective film, such as Enhanced Specular Reflector (ESR), available from 3M Company, St. Paul, Minn.

Optical stack 500 is oriented such that microlens array 520 is proximate to lightguide 554. The relative illustrated sizes of, for example, one or more light sources 550 and lenslet 522 or lightguide 554 and collimating reflective polarizer 510 are for ease of illustration and should not be understood to suggest actual relative dimensions of those components.

Figure 6:
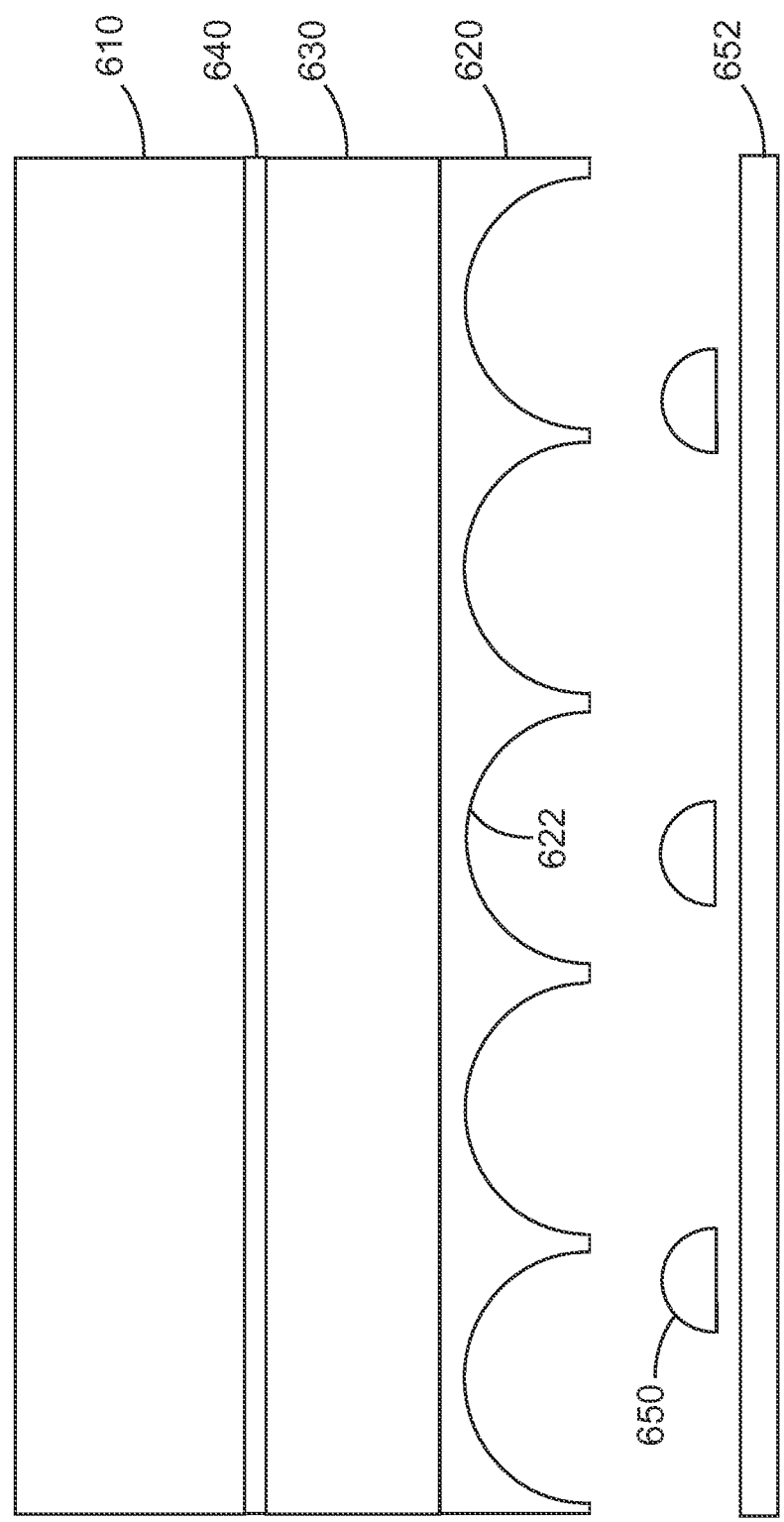
FIG. 6 is a side elevation cross-section of a portion of a direct-lit backlight including the optical film of FIG. 2.

FIG. 6 is a side elevation cross-section of a portion of a direct-lit backlight including the optical film of FIG. 2. Optical stack 600 includes collimating reflective polarizer 610, microlens array 620 including lenslet 622, optical substrate 630, adhesive 640, one or more light sources 650, and reflector 652.

Optical stack 600 shows an optical film corresponding essentially to optical film 200 in FIG. 2, including collimating reflective polarizer 610, microlens array 620 including lenslet 622, optical substrate 630, and adhesive 640. In addition, optical stack 600 includes one or more light sources 650 and reflector 652.

The configuration of one or more light sources 650 and reflector 652 are typical of a direct-lit backlight. In such a system, lightguides are generally not used—instead, light from one or more light sources is directly incident, in FIG. 6, for example, on the optical film corresponding to optical film 200 in FIG. 2. In such cases, bright spots are possible if the light sources are not sufficiently diffused. Light is incident on the optical film. Light reflected by collimating reflective polarizer 610 is reflected back to reflector 652, and then directed back toward the optical film. As in the configuration of FIG. 6, light is recycled within this backlight cavity. Microlens array 620 is configured such that it is proximate one or more light sources 650.

EXAMPLES

Comparative Example C-1

A film stack was prepared by placing a reflective polarizer (DBEF-D2-400) on top of a prism film (320 micron BEF) which was placed on top of a beaded PET diffuser film having a haze of 7% (all available from 3M Company, St. Paul, Minn.). The film was tested as a backlight film with the diffuser layer closest to the backlight. Gain was measured using a SPECTRASCAN PR-650, available from Photo Reasearch, Inc., Chatsworth, Calif. Haze was measured using a HAZE-GARD PLUS 4725 hazemeter (available from BYK-Gardiner, Silver Springs, Md.) On-axis brightness was measured using an ELDIM EZ CONTRAST 160R (available from ELDIM Corp., France). Results are given in Table 1. The film stack was placed above an LED backlight with the diffuser layer closest to the backlight and the degree that the film was able to hide the LEDs was visually assessed. It was found that the film stack provided good hot spot hiding.

Comparative Example C-2

A collimating multilayer optical film (CMOF) was prepared as described in Example 3 of PCT Patent Application Number US 2012/060485, incorporated by reference herein. In particular, using the feedblock method described in U.S. Patent App. Pub. No. 2011/0272849 entitled "Feedblock for Manufacturing Multilayer Polymeric Films", filed May 6, 2011, two packets of 275 layers each of alternating low and high index polymer layers were coextruded as a cast web and then stretched in a tenter on a continuous film making line. The high index material was a 90/10 coPEN (90% naphthalate units and 10% terephthalate units). The low index material differed between packet 1 and packet 2 of the microlayers. The low index material for packet 1 was a blend of PETg (EASTAR GN071 copolyester from Eastman Chemical, Kingsport, Tenn.) and an amorphous 55/45 coPEN (55% naphthlate units and 45% terephthalate units). The blend ratio was adjusted so as to obtain an index of 1.589. The low index material for packet 2 was TRITAN FX150 copolyester from Eastman Chemical (Kingsport, Tenn.) and had a measured index of 1.554. All indices were measured at 633 nm.

Figure 7:
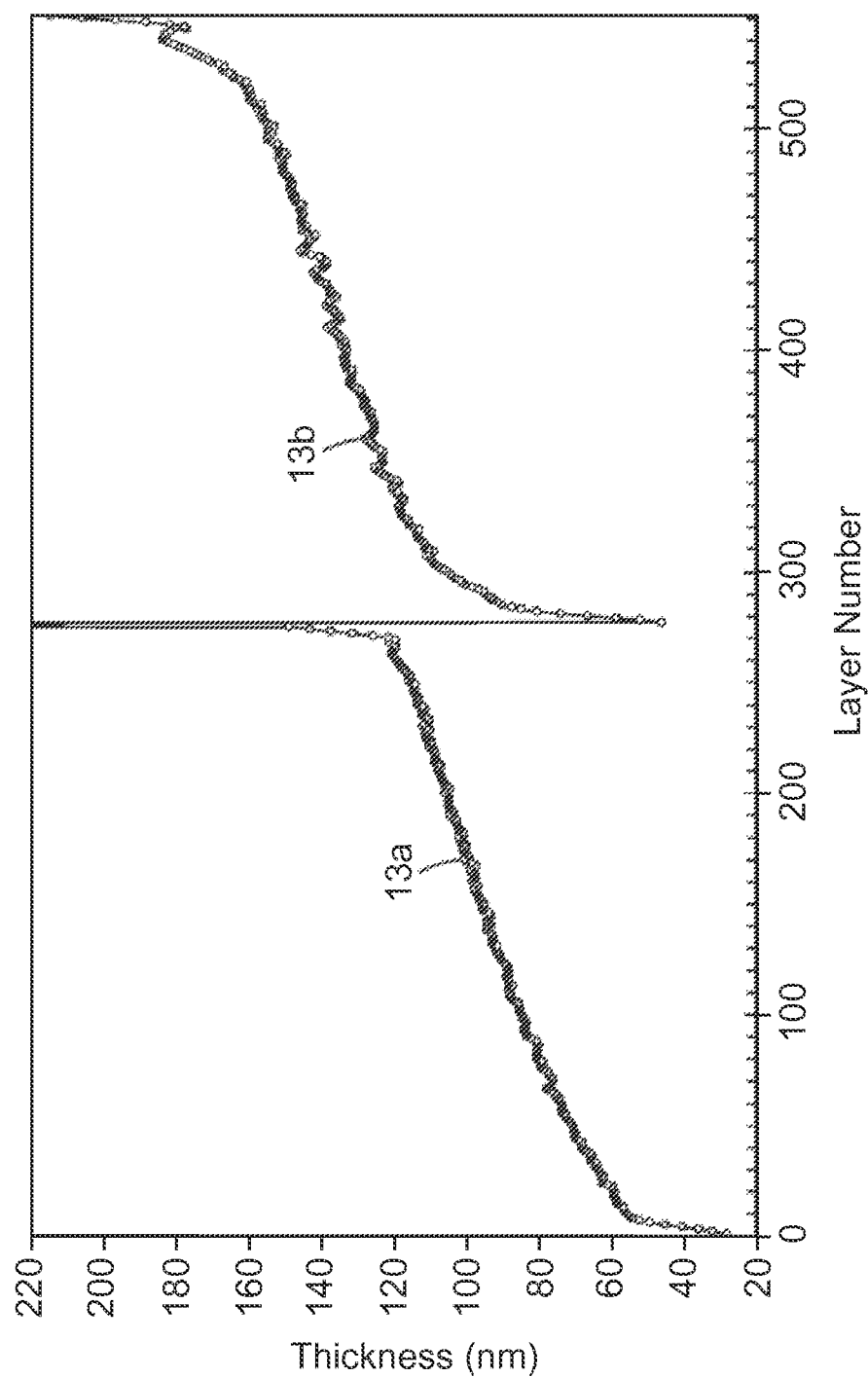
FIG. 7 is a graph showing the layer thickness profile of the collimating reflecting polarizer in Comparative Example C-2.

The layer thickness values of the CMOF film were measured using Atomic Force Microscopy (AFM), and the layer thickness profiles 13a and 13b are shown in FIG. 7 for packets 1 and 2 respectively.

The ratio of pass axis light transmitted at 60 degrees to the transmission value at 0 degrees is a good indication of the collimating potential of the film when used with a recycling backlight. The transmission spectra for p-polarized incident light and s-polarized were determined for incidence angles of 0 and 60 degrees. The average transmission values for each measurement (% T) were estimated by averaging the transmission values of each spectrum between 420 nm and 680 nm. No photopic weighting was used, although this could be applied if desired. The average % T values for the CMOF film were as follows: for p-pol: 75% at 0 deg, dropping to 46% at 60 deg, and for s-pol: 75% at 0 deg dropping to 36% at 60 deg. The ratios of the values of Tpass60/Tpassnormal for p-pol and s-pol light were 0.62 and 0.48 respectively.

Gain, haze and brightness were determined as in Comparative Example C-1 and are reported in Table 1. The degree that the film was able to hide the LEDs was assessed as in Comparative Example C-1 and was found to be very poor.

Comparative Example C-3

A CMOF film was prepared as in Comparative Example C-2 and a beaded diffuser layer (a bead coated 188 micron thick PET film having a 7% haze, available from SKC Haas Display Films (Seoul, Korea) under the trade name CH003U0) was attached to the CMOF using OCA 8171 CL (an optically clear adhesive available from 3M Company, St. Paul, Minn.) with the bead side facing away from the CMOF. The film was tested as a backlight film with the beaded layer closest to the backlight. Gain, haze and brightness were determined as in Comparative Example C-1 and are reported in Table 1. The degree that the film was able to hide the LEDs was assessed as in Comparative Example C-1 and was found to be poor.

Example 1

A CMOF film was prepared as in Comparative Example C-1. A PET film having concave microlenses on one surface was obtained from MNTch Corporation (South Korea). The microlenses had a pitch of about 30 microns and a height of about 10 microns. The microlens film was laminated to the CMOF film using OCA 8171 CL (available from 3M Company, St. Paul, Minn.) with the microlens side facing away from the CMOF. The film was tested as a backlight film with the microlens layer closest to the backlight. Gain, haze and brightness were determined as in Comparative Example C-1. The degree that the film was able to hide the LEDs was assessed as in Comparative Example C-1 and was found to provide good hot spot hiding.

Example 2

A film was made as in Example 1 except that the microlenses had a pitch of about 50 microns and a height of about 25 microns. The film was tested as a backlight film with the microlens layer closest to the backlight. Gain, haze and brightness were determined as in Comparative Example C-1. The degree that the film was able to hide the LEDs was assessed as in Comparative Example C-1 and was found to provide good hot spot hiding.

TABLE 1

| Example | Gain | Haze (%) | On-axis Brightness (nits) | On-axis Brightness, percent of Comp. Ex. C-1 |
|---|---|---|---|---|
| C-1 | 1.92 | 100 | 309 | 100 |
| C-2 | 1.84 | 1 | 275 | 89 |
| C-3 | 1.80 | 71 | 255 | 83 |
| 1 | 1.89 | 100 | 295 | 95.5 |
| 2 | 1.79 | 100 | 279 | 90.3 |

The following are exemplary embodiments according to the present disclosure:

Item 1. An optical film, comprising:
   a collimating reflective polarizer; and
   an array of concave microlenses disposed on a major surface of the collimating reflective polarizer.

Item 2. An optical film, comprising:
   an optical substrate having a first and second major surface;
   a collimating reflective polarizer disposed on the first major surface of the optical substrate; and
   an array of concave microlenses disposed on the second major surface of the optical substrate.

Item 3. The optical film of item 2, further comprising an adhesive between the optical substrate and the collimating reflective polarizer.

Item 4. The optical film of item 1 or 2, wherein the collimating reflective polarizer has a transmission along a pass axis at normal incidence of Tpassnormal for p-pol light and a transmission along a pass axis at 60 degrees incidence of Tpass60 for p-pol light, and a ratio of Tpass60 to Tpassnormal is less than 0.75.

Item 5. The optical film of item 4, wherein the ratio of Tpass60 to Tpassnormal is less than 0.60.

Item 6. The optical film of item 5, wherein the ratio of Tpass60 to Tpassnormal is less than 0.50.

Item 7. The optical film of item 1 or 2, wherein the array of concave microlenses is randomly arranged.

Item 8. The optical film of item 1 or 2, wherein the array of concave microlenses is regularly arranged.

Item 9. The optical film of item 1 or 2, wherein each microlens in the array of concave microlenses has an aspect ratio of about 0.5.

Item 10. The optical film of item 9, wherein each microlens in the array of concave microlenses has an aspect ratio of about 0.3.

Item 11. The optical film of item 1 or 2, wherein each microlens in the array of concave microlenses has an aspect ratio of less than about 0.5.

Item 12. The optical film of item 1, further comprising microfeatures disposed on a surface of the collimating reflective polarizer not disposed on the array of concave microlenses.

Item 13. The optical film of item 2, further comprising microfeatures disposed on a surface of the collimating reflective polarizer not disposed on the optical substrate.

Item 14. The optical film of item 12 or 13, wherein the microfeatures include beads.

Item 15. The optical film of item 14, wherein a mean diameter of the beads is about 8 μm.

Item 16. The optical film of item 12 or 13, wherein the microfeatures include convex lenses.

Item 17. The optical film of item 12 or 13, wherein the microfeatures include prisms.

Item 18. The optical film of item 1 or 2, wherein the optical film has a thickness of less than 420 µm.

Item 19. An edge-lit backlight assembly, comprising:
the optical film of item 1 or 2; and
a lightguide;
wherein the lightguide is disposed proximate the array of concave microlenses.

Item 20. A direct-lit backlight assembly, comprising:
the optical film of item 1 or 2; and
one or more light sources;
wherein the one or more light sources are disposed proximate the array of concave microlenses.

Descriptions for elements in figures should be understood to apply equally to corresponding elements in other figures, unless indicated otherwise. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents

What is claimed is:

1. An optical film, comprising:
a monolithic collimating reflective polarizer; and
an array of concave microlenses disposed on a major surface of the collimating reflective polarizer, wherein the collimating reflective polarizer has a transmission along a pass axis at normal incidence of Tpassnormal for p-pol light and a transmission along the pass axis at 60 degrees incidence of Tpass60 for p-pol light, and a ratio of Tpass60 to Tpassnormal is less than 0.75.

2. The optical film of claim 1, wherein each microlens in the array of concave microlenses has an aspect ratio of about 0.5.

3. The optical film of claim 1, wherein each microlens in the array of concave microlenses has an aspect ratio of less than about 0.5.

4. The optical film of claim 1, further comprising microfeatures disposed on a surface of the collimating reflective polarizer not disposed on the array of concave microlenses.

5. The optical film of claim 4, wherein the microfeatures include beads.

6. An edge-lit backlight assembly, comprising:
the optical film of claim 1; and
a lightguide;
wherein the lightguide is disposed proximate the array of concave microlenses.

7. A direct-lit backlight assembly, comprising:
the optical film of claim 1; and
one or more light sources;
wherein the one or more light sources are disposed proximate the array of concave microlenses.

8. An optical film, comprising:
an optical substrate having a first and second major surface;
a monolithic collimating reflective polarizer disposed on the first major surface of the optical substrate; and
an array of concave microlenses disposed on the second major surface of the optical substrate, wherein the collimating reflective polarizer has a transmission along a pass axis at normal incidence of Tpassnormal for p-pol light and a transmission along the pass axis at 60 degrees incidence of Tpass60 for p-pol light, and a ratio of Tpass60 to Tpassnormal is less than 0.75.

9. The optical film of claim 8, further comprising microfeatures disposed on a surface of the collimating reflective polarizer not disposed on the optical substrate.

10. The optical film of claim 9, wherein the microfeatures include beads.

11. The optical film of claim 8, wherein each microlens in the array of concave microlenses has an aspect ratio of about 0.5.

12. The optical film of claim 8, wherein each microlens in the array of concave microlenses has an aspect ratio of less than about 0.5.

13. An edge-lit backlight assembly, comprising:
the optical film of claim 8; and
a lightguide;
wherein the lightguide is disposed proximate the array of concave microlenses.

14. A direct-lit backlight assembly, comprising:
the optical film of claim 8; and
one or more light sources;
wherein the one or more light sources are disposed proximate the array of concave microlenses.

* * * * *